United States Patent
Jacobs et al.

(10) Patent No.: US 9,684,531 B2
(45) Date of Patent: *Jun. 20, 2017

(54) COMBINING BLADE SERVERS BASED ON WORKLOAD CHARACTERISTICS

(71) Applicant: International Business Machines Corporation, Armonk, NY (US)

(72) Inventors: Brent W. Jacobs, Rochester, MN (US); Venkatesh Sainath, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 331 days.

This patent is subject to a terminal disclaimer.

(21) Appl. No.: 14/464,806

(22) Filed: Aug. 21, 2014

(65) Prior Publication Data

US 2016/0057074 A1 Feb. 25, 2016

(51) Int. Cl.
*H04L 12/911* (2013.01)
*G06F 9/455* (2006.01)
*H04L 29/08* (2006.01)
*H04L 12/26* (2006.01)
*H04L 12/24* (2006.01)

(52) U.S. Cl.
CPC ...... *G06F 9/45558* (2013.01); *H04L 43/0876* (2013.01); *H04L 47/70* (2013.01); *H04L 47/74* (2013.01); *H04L 47/78* (2013.01); *H04L 67/1012* (2013.01); *G06F 2009/4557* (2013.01); *H04L 41/5096* (2013.01)

(58) Field of Classification Search
CPC combination set(s) only.
See application file for complete search history.

(56) References Cited

U.S. PATENT DOCUMENTS

| 6,820,262 | B1 | 11/2004 | Tellez et al. |
| 7,266,823 | B2 | 9/2007 | Alford, Jr. |
| 2004/0054780 | A1* | 3/2004 | Romero ............ H04L 41/5025 709/226 |

(Continued)

OTHER PUBLICATIONS

Mylavarapu et al., "An Optimized Capacity Planning Approach for Virtual Infrastrcture Exhibiting Stochastic Workload," Proceedings of the 2010 ACM Symposium on Applied Computing; Mar. 22, 2010; ACM; New York, United States.

*Primary Examiner* — Chris Parry
*Assistant Examiner* — Caroline Jahnige
(74) *Attorney, Agent, or Firm* — Patterson + Sheridan, LLP

(57) ABSTRACT

To perform a workload, a plurality of virtual machines (VMs) may be assigned to a plurality of blade servers. To assign the VMs, a computing system uses the characteristics of the workloads that will be executed by the virtual machines such as the number of processors or the amount of memory, storage the workload is estimated to use, and the like. Based on these workload characteristics, the computing system determines an optimal solution for deploying the VMs onto the blade servers. In one embodiment, the computing system determines whether two or more of the blade servers should be stitched together. For example, the computing system compares the workload characteristics of one of the virtual machine to the combined available resources of at least two of the blade servers. If the combined available resources satisfy the workload characteristics, the computing system stitches the blade servers together.

11 Claims, 8 Drawing Sheets

(56) References Cited

U.S. PATENT DOCUMENTS

| | | | |
|---|---|---|---|
| 2005/0120160 A1* | 6/2005 | Plouffe | G06F 9/45537 711/1 |
| 2008/0320121 A1 | 12/2008 | Altaf et al. | |
| 2011/0023029 A1* | 1/2011 | Diab | G06F 9/5077 718/1 |
| 2011/0202925 A1* | 8/2011 | Banerjee | G06F 9/5011 718/104 |
| 2012/0173734 A1* | 7/2012 | Kimbrel | G06F 9/5083 709/226 |
| 2013/0073730 A1* | 3/2013 | Hansson | G06F 9/5044 709/226 |
| 2013/0198050 A1 | 8/2013 | Shroff et al. | |
| 2013/0239112 A1* | 9/2013 | Kato | G06F 9/5077 718/1 |
| 2016/0098297 A1* | 4/2016 | Yuyitung | G06F 11/3442 718/104 |

* cited by examiner

500

| VM | ASSIGNED WORKLOAD (WL) | COMBINED WORKLOAD CHARACTERISTICS | PRIORITY |
|---|---|---|---|
| VM 1 | WL 1, WL 2 | 8 PROCESSORS, 4 GB | 1 |
| VM 2 | WL 3 | 8 PROCESSORS, 2 GB, DEDICATED I/O | 2 |
| VM 3 | WL 4, WL 5 | 6 PROCESSORS, 8 GB, SPECIAL GPU | 3 |
| VM 4 | WL 6 | 3 PROCESSORS, 1 GB | 4 |
| VM 5 | WL 7, WL 8, WL 9 | 2 PROCESSORS, 4 GB, SPECIAL MEMORY | 5 |
| VM 6 | WL 10 | 1 PROCESSOR, 5 GB, DEDICATED I/O | 6 |

| BLADE SERVER | AVAILABLE RESOURCES | SPECIAL FEATURES | PRIORITY |
|---|---|---|---|
| BLADE 1 | 10 PROCESSORS, 4 GB |  | 1 |
| BLADE 2 | 5 PROCESSORS, 10 GB | SPECIAL GPU | 2 |
| BLADE 3 | 5 PROCESSORS, 6 GB | SPECIAL MEMORY | 3 |
| BLADE 4 | 4 PROCESSORS, 10 GB | SPECIAL GPU | 4 |
| BLADE 5 | 4 PROCESSORS, 4 GB | SPECIAL MEMORY | 5 |
| BLADE 6 | 3 PROCESSORS, 10 GB |  | 6 |
| BLADE 7 | 2 PROCESSORS, 8 GB |  | 7 |

| | BLADE SERVER | ASSIGNED VM | REMAINING RESOURCES IN BLADE |
|---|---|---|---|
| STITCHED BLADE 1 | BLADE 5 | VM 5 | 2 PROCESSORS, 0 GB |
| | BLADE 2 / BLADE 4 | VM 3 | 3 PROCESSORS, 12 GB |

| BLADE SERVER | AVAILABLE RESOURCES | PRIORITY |
|---|---|---|
| BLADE 1 | 10 PROCESSORS, 4 GB | 1 |
| BLADE 3 | 5 PROCESSORS, 6 GB | 2 |
| STITCHED BLADE 1 | 3 PROCESSORS, 12 GB | 3 |
| BLADE 6 | 3 PROCESSORS, 10 GB | 4 |
| BLADE 7 | 2 PROCESSORS, 8 GB | 5 |
| BLADE 5 | 2 PROCESSORS, 0 GB | 6 |

| REMAINING VMs | WL CHARACTERISTICS | PRIORITY |
|---|---|---|
| VM 2 | 8 PROCESSORS, 2 GB | 1 |
| VM 6 | 1 PROCESSOR, 5 GB | 2 |

| BLADE SERVER | ASSIGNED VM | REMAINING RESOURCES IN BLADE |
|---|---|---|
| BLADE 1 | VM 2 | 2 PROCESSORS, 2 GB |
| BLADE 3 | VM 6 | 4 PROCESSORS, 1 GB |

| BLADE SERVER | AVAILABLE RESOURCES | PRIORITY |
|---|---|---|
| BLADE 5 | 2 PROCESSORS, 0 GB | 1 |
| BLADE 1 | 2 PROCESSORS, 2 GB | 2 |
| BLADE 7 | 2 PROCESSORS, 8 GB | 3 |
| BLADE 6 | 3 PROCESSORS, 10 GB | 4 |
| STITCHED BLADE1 | 3 PROCESSORS, 12 GB | 5 |
| BLADE 3 | 4 PROCESSORS, 1 GB | 6 |

| REMAINING VMs | WL CHARACTERISTICS | PRIORITY |
|---|---|---|
| VM 1 | 8 PROCESSORS, 4 GB | 1 |
| VM 4 | 3 PROCESSORS, 1 GB | 2 |

540

| | BLADE SERVERS | ASSIGNED VM | REMAINING RESOURCES IN BLADE |
|---|---|---|---|
| STITCHED BLADE 2 | BLADE 5 | VM 1 | 1 PROCESSOR, 16 GB |
| | BLADE 1 | | |
| | BLADE 7 | | |
| | BLADE 6 | | |
| | STITCHED BLADE 1 | VM 4 | 0 PROCESSOR, 11 GB |

| BLADE SERVERS | ASSIGNED VM | BLADE SERVERS IN STITCHED BLADE |
|---|---|---|
| STITCHED BLADE 1 | VM 3, VM 4 | BLADES 2 AND 4 |
| STITCHED BLADE 2 | VM 1, VM 2, VM 5 | BLADES 1, 5, 6 AND 7 |
| BLADE 3 | VM 6 | |

*FIG.5J*

COMBINING BLADE SERVERS BASED ON WORKLOAD CHARACTERISTICS

BACKGROUND

The present invention relates to deploying virtual machines onto blade servers, and more specifically, using workload characteristics to determine whether to stitch blade servers together.

A typical blade server chassis can hold 7 full wide blades, which each occupy two slots, or 14 half wide blades, which each occupy one slot. The blade servers typically include independent operating servers and separate processors, memory, storage, hypervisors, etc. The blade server chassis includes a backplane that is used to permit the blades to communicate with each other and the outside world.

In some instances, two or more of the blade servers operate as a single blade server. More specifically, when the blade servers are ordered from a vendor, the purchaser specifies whether the blades should be independent servers or combined. Once this mode of operation is selected, the blade servers remain in the specified mode—i.e., the blade servers do not change their mode.

SUMMARY

Embodiments of the present disclosure disclose a method that includes assigning workloads to a plurality of virtual machines where each of the plurality of virtual machines is associated with one or more workload characteristics defining an expected amount of computer resources required for executing the workloads assigned to the virtual machine. The method includes assigning the plurality of virtual machines to a plurality of servers by comparing the workload characteristics to combined available resources of at least two of the plurality of servers where each of the plurality of servers are physically separate computing devices. Upon determining the combined available resources satisfy the workload characteristics, the method includes stitching the at least two of the plurality of servers together to form a stitched server where the at least two of the plurality of servers share a same hypervisor instance. The method includes assigning at least one of the plurality of virtual machines to be executed on the stitched server.

Another embodiment of the present disclosure is a system that includes a computer processor and a memory containing a program that, when executed on the computer processor, performs an operation. The operation includes assigning workloads to a plurality of virtual machines where each of the plurality of virtual machines is associated with one or more workload characteristics defining an expected amount of computer resources required for executing the workloads assigned to the virtual machine. The operation also includes assigning the plurality of virtual machines to a plurality of servers by comparing the workload characteristics to combined available resources of at least two of the plurality of servers where each of the plurality of servers are physically separate computing devices. Upon determining the combined available resources satisfy the workload characteristics, the operation includes stitching the at least two of the plurality of servers together to form a stitched server, wherein the at least two of the plurality of servers share a same hypervisor instance. The operation further includes assigning at least one of the plurality of virtual machines to be executed on the stitched server.

Another embodiment of the present disclosure is computer program product for assigning one or more resources based on an event occurring in a virtual environment. The computer program product includes a computer-readable storage medium having computer-readable program code configured to assign workloads to a plurality of virtual machines where each of the plurality of virtual machines is associated with one or more workload characteristics defining an expected amount of computer resources required for executing the workloads assigned to the virtual machine. The program code is configured to assign the plurality of virtual machines to the plurality of servers by comparing the workload characteristics to combined available resources of at least two of the plurality of servers where each of the plurality of servers are physically separate computing devices. Upon determining the combined available resources satisfy the workload characteristics, the program code is configured to stitch the at least two of the plurality of servers together to form a stitched server, wherein the at least two of the plurality of servers share a same hypervisor instance. The program code is configured to assign at least one of the plurality of virtual machines to be executed on the stitched server.

BRIEF DESCRIPTION OF THE SEVERAL VIEWS OF THE DRAWINGS

FIGS. 5A-5J include graphs illustrating different blocks of the flowchart in FIG. 4, according to one embodiment described herein.

Figure 1:
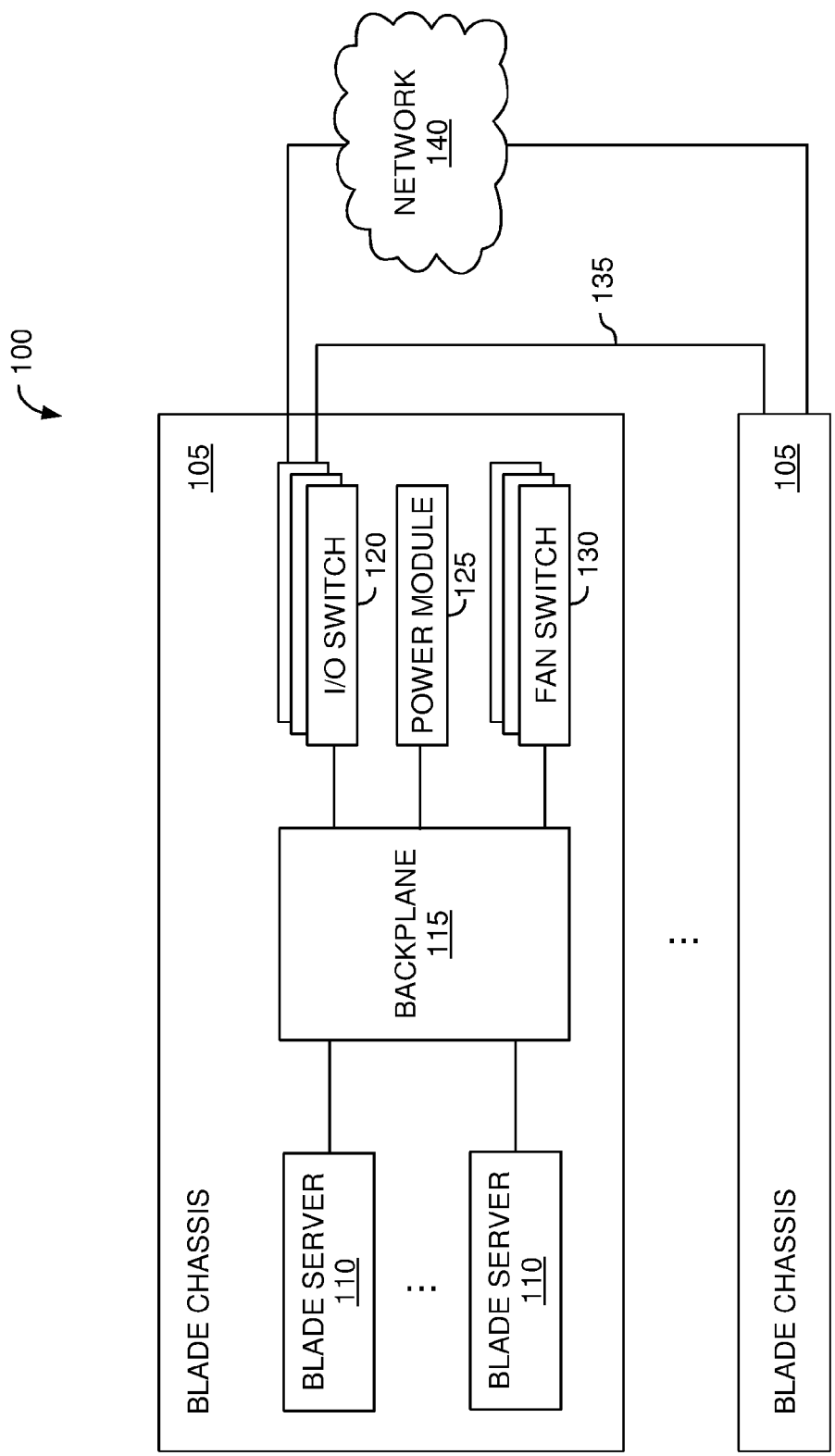
FIG. 1 is a computing system that includes a plurality of blade chassis, according to one embodiment described herein.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

Embodiments described herein provide a computing system where the blade servers can be configured according to workload characteristics and/or operating heuristics. For example, when assigning the virtual machines (VMs) to the blades servers, the computing system uses the characteristics of the workloads that will be executed by the VMs—e.g., the number of processors or the amount of memory or storage the workload is estimated to use, special hardware requirements of the workload, or I/O requirements of the workload—to determine an optimal solution for deploying the VMs onto the blade servers. In one embodiment, the computing system determines whether two or more of the blades servers should be stitched together to form a stitched blade server. As used herein, a "stitch blade server" refers to at least two blade servers that share a single hypervisor instance. For example, the two blade servers in a stitched blade server may operate in the SMP configuration which enable the two servers to act like a single blade server.

In one embodiment, after the VMs are deployed on the blade servers, the computing system monitors operating heuristics to update the characteristics of the workloads executing on the VMs. For example, when deploying the blade servers, the workload characteristics may be provided by the customer. For example, the customer may state that a particular workload requires 2 processors and 4 gigabytes (GB) of memory to execute efficiently. However, by monitoring operating heuristics such as processor utilization, memory utilization, I/O utilization, and the like as the workload executes, the computing system may determine that one or more of the customer provided workload characteristics should be adjusted. For example, the workload may need 1 processor and 6 GB in order to execute effectively. Or the system may determine that the workload should be assigned a dedicated I/O card or special hardware module or software application to improve performance. Based on the updated workload characteristics, the computer system may again determine the optimal solution for deploying the VMs onto the blade servers and redeploy the VMs if the new solution is different than the current deployment.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be used to establish a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data that are executed or stored in virtual machines deployed on blade servers described herein. For example, the application may be a workload that, based on its characteristics, is executed on a blade server that is part of the cloud. Doing so allows a user to access this information from any computing system attached to a network connected to the cloud (e.g., the Internet).

FIG. 1 is a computing system 100 that includes a plurality of blade chassis 105, according to one embodiment described herein. As shown, the plurality of blade chassis 105 includes a plurality of blade servers 110. Although the term blade server is used throughout this disclosure, the embodiments described herein may be extended to any computing device that can host a VM. Each of the blade servers 110 is coupled to a backplane 115 which provides an intra-chassis communication channel between the blades servers 110. Furthermore, the backplane 115 connects the blade servers 110 to I/O switches 120 which permit communication with a network 140 (e.g., the Internet) and to a high-speed interconnect 135 which provides a direct communication channel between the plurality of blade chassis 105. The backplane 115 also permits the blade servers 110 to receive DC and/or AC power from power module 125 as well as control the fan switch 130 which changes the environmental conditions within the chassis 105.

Figure 2:
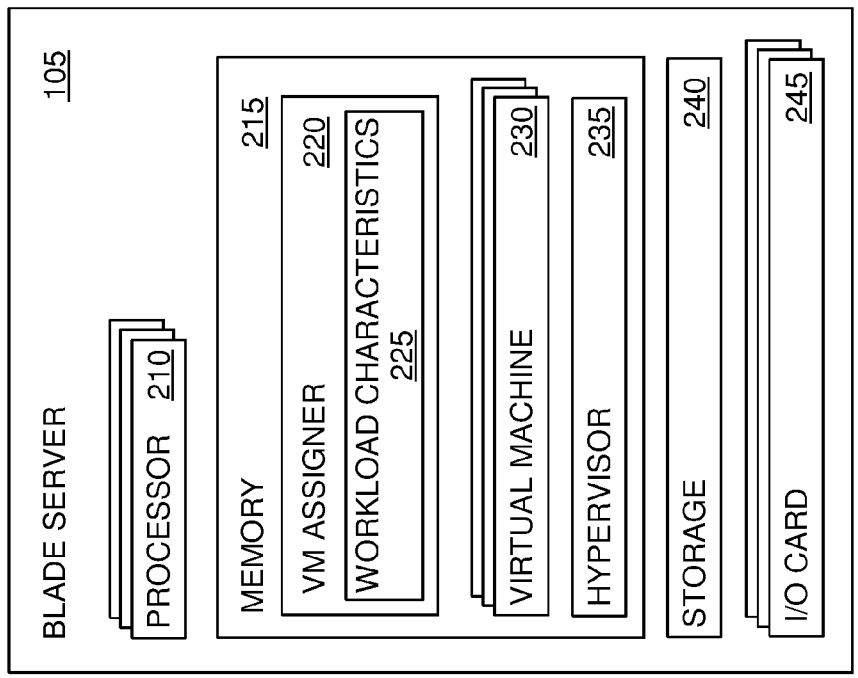
FIG. 2 is a block diagram of a blade server, according to one embodiment described herein.

FIG. 2 is a block diagram of the blade server 105, according to one embodiment described herein. As shown, the server 105 includes one or more processors 210, memory 215, storage 240, and I/O cards 245. The processor 210 represents any number of processors which each may contain one or more processing cores. Memory 215 may include volatile memory, non-volatile memory, or a combination of both. Memory 215 may include, for example, RAM or cache. As shown, memory 215 stores a VM assigner 220 which uses workload characteristics 225 (e.g., number of processors, or amount of memory or storage, special hardware requirements, or I/O requirements of the workload) to determine how to assign VMs 230 to the various blade servers 105. In one embodiment, the VM assigner 220 is loaded onto only one of the blade servers 105 which then deploys the VMs 230 on the blade servers 105 in a computing system. Alternatively, the VM assigner 220 may be executed on a computing device that is different from the blade server 105 but is nonetheless communicatively coupled to the blade servers 105. The various techniques the VM assigner 220 uses to assign and deploy the VMs 230

(and the workloads executing on the VMs 230) to the blade servers 105 is discussed in more detail below.

The blade server 105 may host any number of VMs 230. Although not shown, the VMs 230 are also assigned one or more workloads which may be an application, a data store, and the like. Specific examples of a workload include a function of a web server, transactional server, relational database, a parallel processing node, and the like. To manage the VMs 230, the blade server 105 includes a hypervisor 235. Although shown here as being stored in memory (e.g., a software application), in other embodiments, the hypervisor 235 may be firmware, hardware, or a combination thereof. In one embodiment, the hypervisor 230 permits multiple VMs 230 to share the same physical hardware of the blade server 105.

The storage 240 of the blade server 105 includes internal storage elements such as hard disk drives, tape storage, and the like. Moreover, storage 240 may also include external storage elements that are coupled to the blade server 105.

The I/O cards 245 permit the components and applications in the blade server 105 to communicate external with other servers, networks, user computing devices, and the like. While the I/O cards 245 may be shared by the various components and applications in the server 105, in other embodiments one or more of the I/O cards 245 are dedicated to a specific component or application. For example, one of the I/O cards 245 may be dedicated to a particular VM 230 for security reasons or to guarantee a minimum I/O bandwidth.

Figure 3:
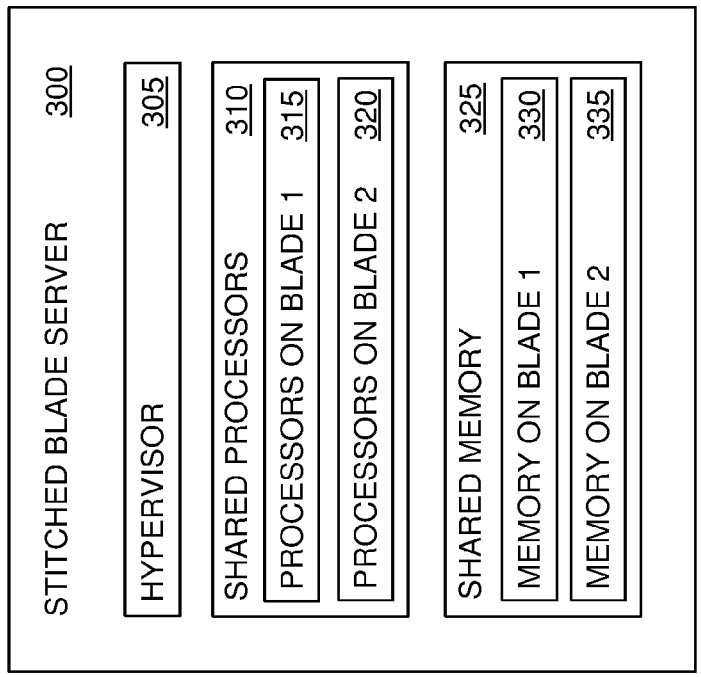
FIG. 3 illustrates a stitched blade that includes a plurality of blade servers, according to one embodiment described herein.

FIG. 3 illustrates a stitched blade server 300 that includes a plurality of blade servers, according to one embodiment described herein. The stitched blade server 300 is a logical representation of a blade server. That is, to computing devices communicating with the stitched blade 300, the blade 300 is perceived as a real, physical blade server. However, in reality, the stitched blade server 300 is a logical combination (or "stitching") of multiple blade servers. To create this logical combination, the plurality of underlying physical blade servers shares the same hypervisor 305. In one embodiment, the hypervisor 305 executes on the processors in blades servers in the stitched configuration. The hypervisor 305, however, manages the VMs and hardware resources on all of the blade servers. As such, the VMs hosted by the stitched blade server 300 view the hardware resources of the individual blade servers as shared resources.

As shown in FIG. 3, the processors 315 of Blade 1 and the processors 320 of Blade 2 are combined to form shared processors 310. The different VMs executing on the stitched blade 300 can use the processors 310 regardless of whether these processors 310 on are physically located on Blade 1 or Blade 2. Similarly, shared memory 325 includes memory 330 on Blade 1 and memory 335 on Blade 2. This shared memory 325 is managed by the hypervisor 305 so that any of the VMs can access the memory 325 to execute their assigned workloads.

Figure 4:
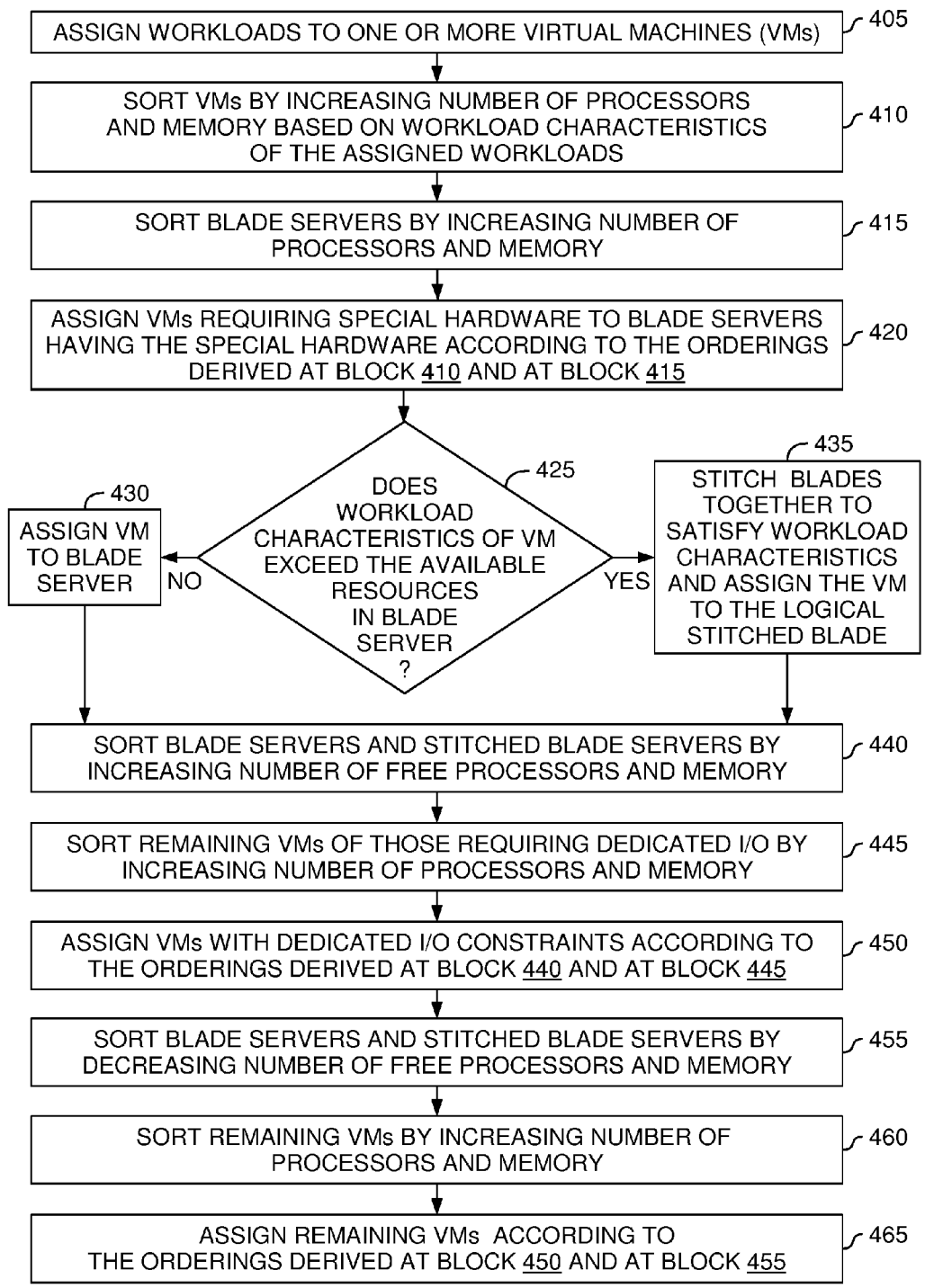
FIG. 4 is a flowchart for assigning virtual machines to blade servers, according to one embodiment described herein.

FIG. 4 is a flowchart 400 for assigning virtual machines to blade servers, according to one embodiment described herein. To better illustrate the blocks of flowchart 400, FIGS. 5A-5J will be discussed contemporaneously with the related blocks of flowchart 400. Specifically, FIGS. 5A-5J include graphs that illustrate one example of performing the flowchart 400.

At block 405, the VM assigner allocates the workloads to one or more VMs. In one example, each workload may be assigned to each VM. Alternatively, workloads associated with the same application may be assigned to the same VM. For example, if there are four workloads associated with a web server application, these workloads may be assigned to the same VM. Nonetheless, the embodiments described herein are not limited to any particular method for assigning the workloads.

At block 410, the VM assigner sorts the VMs by increasing number of processors and memory based on the characteristics of the workloads assigned to the VMs. As discussed above, each workload is associated with a list of characteristics that define the estimated requirements for executing the workload efficiently, such as the number of processors required, the amount of memory required, I/O requirements, special hardware or software requirements, and the like. These workload characteristics are then imputed to the VMs that are assigned the workloads at block 405. For example, if two workloads are assigned to a VM that require 2 and 3 processors, respectively, to operate efficiently, the VM assignor attempts to assign the VM to a blade server that includes at least 5 processors.

To illustrate one example of performing block 410, FIG. 5A illustrates a chart 500 that includes six VMs (i.e., VM 1, VM 2, and so forth.) that are arranged by increasing number of processors and memory. Specifically, in chart 500, the VMs are first sorted based on the required number of processors and then secondarily sorted by the required amount of memory to break any ties (i.e., if two VMs require the same number of processors). For example, workloads (WL) 1 and 2 are assigned to VM 1 which, in combination, require 8 processors and 4 GB of memory, and WL 3 is assigned to VM 2 which also requires 8 processors but only 2 GB of memory. Although both VM 1 and VM 2 require the same number of processors, because VM 1 requires more memory than VM 2, VM 1 is given a higher priority in chart 500. In this manner, each of the VMs are sorted according to the combined total of processors and memory of the workloads assigned to the VMs. The resulting priority from ordering the VMs is shown in the rightmost column where the highest priority VM is assigned a 1 and the lowest propriety VM is assigned a 6. As will be discussed later, the priority is used match the VMs to the blade servers.

Although chart 500 illustrates first sorting by the estimated number of processors required and then performing a second sort based on the estimated amount of memory required, in another embodiment, the reverse may be true. Furthermore, in other embodiments, the VM assigner may use different workload characteristics than the ones shown in FIG. 5A, such as estimated I/O requirements or estimated bandwidth requirements of the workloads in order to sort the VMs.

Chart 500 also lists certain special requirements that are associated with the workloads and VMs. For example, WL 3 requires a dedicated I/O card while WL 4 or WL 5 requires a special graphics processing unit (GPU). Generally, a special requirement may be any special hardware, application, or request that a blade server hosting the workload should include or fulfill. Other examples of special requirements include a particular version of an operating system, a minimum port speed, a particular communication link, a security service, special memory (e.g., phase-change memory), and the like. Similar to the number of processors or amount of memory required by the workload, the customer may inform the VM assigner which workloads have special requirements.

Returning to FIG. 4, at block 415, the VM assigner sorts the blade servers by increasing number of processors and memory contained in each blade server. One example of doing so is provided in chart 505 of FIG. 5B. Here, the computing system includes 7 blade servers (Blade 1, Blade 2, and so forth) which each include a certain number of processors and memory. Like in chart 500, in chart 505, the blades are first sorted by the number of processors in the blade and then again sorted using the amount of memory in the blades to break any ties. A priority value is then assigned to each blade. However, this is only one example of sorting the blades. Similar to the VMs, the blade server may be sorted based on other characteristics such as I/O hardware or bandwidth. Nonetheless, in one embodiment, the same characteristics used to order the VMs are also used to order the blade server so that the VMs and blade servers are more easily matched as discussed below.

Chart 505 also includes a third column that lists the special features of the blades servers which may correspond to the special requirements of the VMs shown in chart 500. As shown, Blades 2 and 4 include a particular GPU while Blades 3 and 5 include a particular memory type (e.g., phase change memory). Although in chart 505, the blades are not ordered according to the special features in the third column, in other embodiments, these features may be used to sort the blades.

Returning to FIG. 4, at block 420, the VM assigner matches the VMs requiring special hardware or applications to blade servers having those special features based on the ordering derived at block 410 (e.g., chart 500 in FIG. 5A) and at block 415 (e.g., chart 505 in FIG. 5B). The result of this matching process is shown in chart 510 of FIG. 5C. Because VM 5 requires a particular memory which is found only in Blades 3 and 5, the VM assigner assigns VM 5 to the blade that has the highest priority in chart 505—i.e., Blade 3. This is shown in chart 510 where VM 5 is assigned to Blade 5. Returning to method 400, at block 425, the VM assignor determines if the workload characteristics of the VM exceed the available resources in the blade server. Because Blade 5 does include enough processors and memory to satisfy the workload characteristics of VM 5, the method 400 proceeds to block 430 and VM 5 is assigned to Blade 5. The third column in chart 510 illustrates the effect this assignment has on the available resource of Blade 5. Because VM 5 is estimated to require 2 processors and 4 GB of memory, the VM assigner updates the available resource of Blade 5 based on this amount—i.e., Blade 5 now has only 2 processors free for assignment and 0 GB of remaining memory.

A similar process is followed to assign VM 3 which can be assigned only to Blades 2 and 4 since these servers include the particular GPU required to perform one of the workloads performed by VM 3. At block 425 of method 400, the VM assignor determines if the workload characteristics of the VM exceed the available resources in the blade server. However, unlike above, Blade 2 does not include enough available resources to satisfy the estimated workload characteristics of VM 3. That is, VM 3 requires 6 processors but Blade 2 (the highest ranked Blade that has the GPU) only has 5 processors. As such, method 400 proceeds to block 435 where the VM assigner determines whether to stitch two or more blade servers together to satisfy the workload characteristics of VM 3. That is, the VM assigner determines whether the VM should be assigned to a blade server operating in the independent configuration or to a plurality of blade servers that are stitched together. In one embodiment, method 400 may occur any time before the VMs begin executing on the blade servers. However, as discussed later, method 400 may also be repeated after the VMs have begun executing on the blade servers.

In one embodiment, the VM assigner uses one or more threshold criteria to determine whether to stitch two or more blade servers together or to host the VM on an independent blade server. For example, if the blade server lacks less than 25% of the workload characteristics requested by the VM, the VM assigner combines the blade server with one or more compatible blade servers to generate the stitched blade server. In the example shown in FIGS. 5A-5C, Blade 2 has sufficient memory for VM 5 but lacks one less processor than what is required by VM 5. That is, Blade 2 has 5 out of the 6 requested processors and thus lacks 17% of the number of processors requested by VM 5 which is less than the 25% threshold. As such, the VM assigner stitches Blade 2 together with Blade 4 (which also has the special GPU requested by VM 3) to generate Stitched Blade 1. However, if we instead assume that VM 3 requires 8 processors, then Blade 2 would have 5 out of the 8 requested processors and thus lacks 38% of the requested processors. In this scenario, the VM assigner may first attempt to assign VM 3 to an independent blade rather than stitching blades together. For example, the VM assignor may proceed to the next blade in the sorted list to see if that blade has enough resources to satisfy the workload characteristics. However, there may not be any individual blade that can satisfy the workload characteristics of the VM (as is the case here since neither Blade 2 nor 4, which include the special GPU, individually have enough available resources for VM 3). In this situation, the VM assignor proceeds with stitching together two blades in order to satisfy the workload characteristics of the VM.

The VM assignor also updates the available resources of the stitched blade servers which includes the combined resources of the underlying blade servers. For example, Stitched Blade 1 includes 9 processors and 20 GB of memory. Once VM 3 is assigned, Stitched Blade 1 now includes 3 free processors and 12 GB of available memory.

Returning to method 400, at block 440, the VM assignor sorts the blade servers and stitched blade servers (if any) by increasing number of free processors and memory. As shown in chart 515 of FIG. 5D, Blade 2 and 4 no longer appear as individual blades but instead are represented as Stitched Blade 1 and are treated as a single blade server. In addition to this change, the placement of Blade 5 has fallen relative to the order shown in chart 505 because VM 5 has now been assigned to this blade.

At block 445, the VM assignor sorts the remaining unassigned VMs that include dedicated I/O according to increasing number of processors and memory. This is shown graphically in chart 520 of FIG. 5E where VM 2 and VM 6 (which both should be assigned a dedicated I/O card) are ordered based on processors. If there is a tie, then the VM assignor uses the amount of requested memory to perform a second sort.

At block 450, the VM assignor assigns the VM with dedicated I/O constraints according to the blade order derived at block 440 (e.g., chart 515 of FIG. 5D) and the VM order derived at block 445 (e.g., chart 520 of FIG. 5E). The result of this assignment or matching process is illustrated in chart 525 of FIG. 5F. Because Blade 1 (the highest priority blade server) has enough available resources to satisfy the workload characteristics of VM 2 (the highest priority VM), VM assignor assigns VM 2 to Blade 1 which leaves Blade 1 with 2 free processors and 2 GB of available memory. Next, the VM assignor determines if VM 6 (the next highest ordered VM server) can also be hosted on Blade 1. Because VM 6 requires 5 GB of memory but Blade 1 only has 2 GB of memory remaining after being assigned VM 2, the VM assignor determines whether Blade 1 should be stitched together with another blade. That is, the VM assignor again repeats the logic in blocks 425, 430, and 435 when assigning VMs at block 450. Because Blade 1 only has 2 of the 5 GB of memory requested by VM 6 available (e.g., the memory of VM 6 "spills over" Blade 1 by 60% which exceeds the 25% threshold), the VM assignor assigns VM 6 to the next blade in the chart 515—i.e., Blade 3. Because Blade 3 does have enough available resources, the VM assignor makes the assignment and updates the available resources on Blade 3.

At block 455, the VM assignor sorts the blade serves and stitched blades servers (if any exist) according to decreasing number of free processors and memory. That is, in contrast to blocks 415 and 440 where the blades are sorted based on increasing number of processors, here the reverse is true. Doing so may better consolidate the VMs onto the blade servers so that if any blade servers remain unused after method 400 completes, those servers can be placed in a low power state to conserve power. Chart 530 of FIG. 5G illustrate ordering the blades based on decreasing number of processors and memory where memory is used as a secondary sort to break any ties.

At block 460, the VM assigner sorts the remaining VMs by increasing number of processor and memory 460 which is shown by graph 535 of FIG. 5H. At block 465, the VM assignor assigns the remaining VMs according to the orderings derived at blocks 450 and 455. These assignments are shown in graph 540 of FIG. 5I. To assign VM 1, the VM assignor determines if Blade 5 has enough resources to satisfy the workload characteristics of VM 1. That is, at block 465, the VM assignor may again use the logic shown in Blocks 425, 430, and 435. Because Blade 5 does not have sufficient resources, the VM assignor determines if the stitching together different blades results in a stitched blade sufficient to satisfy the workload characteristics. However, because Blade 5 has only 2 processors and 0 GB of memory, assigning VM1 to Blade 5 will cause the VM to "spill out" more than the 25% threshold. Nonetheless, the VM assignor is forced to stitch together blades since none of the blades individually have enough available resources to satisfy the workload characteristics of VM 1. As such, the VM assignor stitches together four blade servers—Blades 5, 1, 7, and 6—to form Stitched Blade 2 that includes 9 processors and 20 GB of memory. After making this assignment, Stitched Blade 2 has 1 processor and 16 GB of memory remaining.

To assign VM 4, the VM assignor determines whether this VM can first be assigned to Stitched Blade 2. However, because Stitched Blade 2 has only 1 available processor which means this blade cannot supply 66% of the processors required by VM 4, (which is greater than the 25% threshold) the VM assignor instead determines if VM 4 can be assigned to the next blade in the order—i.e., Stitched Blade 1. Because Stitched Blade 1 includes enough available resources, the VM assignor selects this blade to host VM 4.

Alternatively, if stitching together Stitched Blade 2 with Stitched Blade 1 would have satisfied the 25% threshold, then the VM assignor would have combined these blades to yield Stitched Blade 3 which includes Blade 1, 2, 4, 5, 6, and 7. That is, because a stitched blade server is consider the same as an individual blade server, it is equally permissible to combine a stitched blade server with another independent blade server, or combine two stitch blade servers to satisfy the workload characteristic of a VM as discussed in Block 435.

Chart 545 of FIG. 5J illustrates the final assignment of the VMs to the blade servers. As shown, Blades 2 and 4 are combined to form Stitched Blade 1 which hosts VM 3 and VM 4. That is, when the computing system that includes Blades 1-7 is configured, Blades 2 and 4 are set to the SMP operational mode so that they share the same instance of a hypervisor as discussed in FIG. 3. Moreover, Blades 1, 5, 6, and 7 are combined to form Stitched Blade 2 which hosts VM1, VM 2, and VM 5. Blade 3, however, is set to the independent mode of operation and hosts VM 6.

Figure 6:
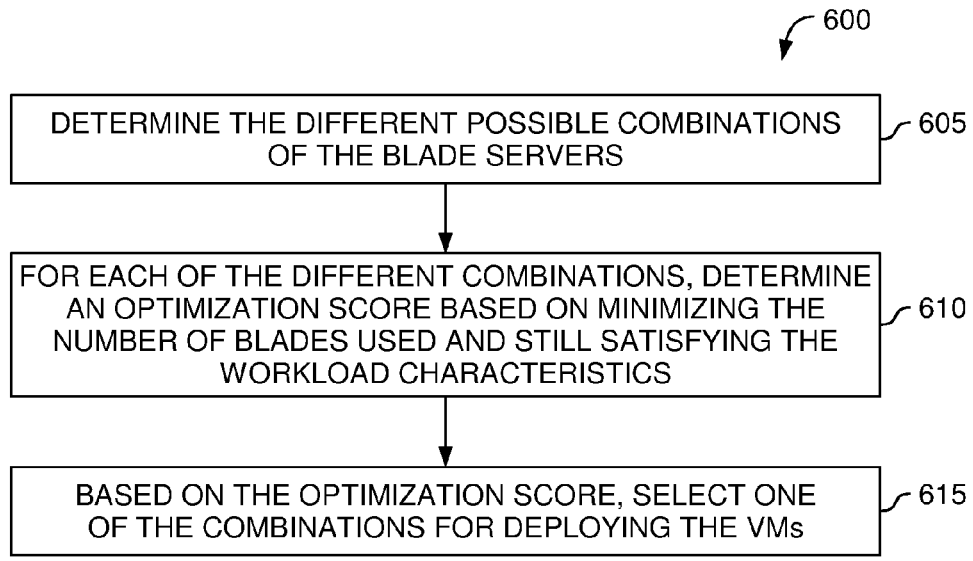
FIG. 6 is a flowchart for assigning virtual machines to blade servers, according to one embodiment described herein.

FIG. 6 is a flowchart 600 for assigning virtual machines to blade servers, according to one embodiment described herein. For example, flowchart 600 is an alternative to the flowchart 500 shown in FIG. 5 to determine whether to stitch together one or more of the blade servers in order to host the VMs. Although the flowcharts 500 and 600 may be used independently, different elements of these flowcharts 500, 600 may combined or used in tandem to determine an optimal solution for assigning the VMs to the blades.

At block 605, the VM assignor determines all the different possible combinations of the blade servers. For example, assuming there are three blade servers in a computing system (e.g., Blades A, B, and C), the possible combinations are A*B*C, A|B|C, A*B|C, A*C|B, and B*C|A where the * symbol indicates blades that are stitched together and the | symbol indicates blades that are operating independently.

At block 610, for each of the different combinations, the VM assignor determines an optimization score based on minimizing the number of blades used, while still satisfying the workload characteristics of the VMs. In one embodiment, the optimization score may be based on an empirical model such as the one described in *An Optmized Capacity Planning Approach for Virtual Infrastructure Exhbiiting Stochastic Workload*, by Swarma Mylavarapu, et al. *Proceedings of the* 2010 *ACM symposium on Applied Computing*, pp. 386-390 which is herein incorporated by reference in its entirety. In the model presented in that paper, capacity planning was modeled as a stochastic optimization problem with the objective of minimizing the number of servers while considering two constraints: (1) stochastic nature of workloads, and (2) minimizing the application of service level agreement (SLA) violations. This model can be adapted to the present disclosure where instead of the blade servers being fixed in either the independent configuration or SMP configuration, the blades can be switched into either mode dynamically. As such, the VM assignor uses the model in the paper to evaluate each of the combinations identified at block 605 to derive a respective optimization score for each combination. In this manner, by recognizing that the blades can be combined into different ways, models such as the one in the paper can be used to evaluate and rank the different combinations.

At block 615, the VM assignor chooses the combination with the highest optimization score and assigns the VMs based on this combination. That is, the model determines, for each of the combinations, the optimal placement of the VMs on the blade servers. Thus, the VM assignor deploys the VMs according to the iteration which produced the highest optimization score.

Figure 7:
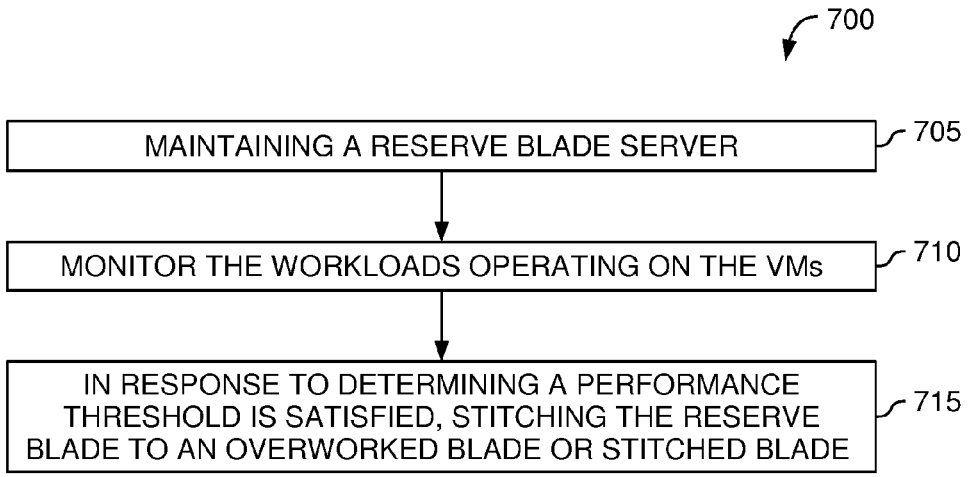
FIG. 7 is a flowchart for stitching reserve blade servers to a blade server hosting a virtual machine, according to one embodiment described herein.

FIG. 7 is a flowchart 700 for stitching reserve blade servers to a blade server hosting a virtual machine, according to one embodiment described herein. At block 705, the VM assignor maintains at least one reserve blade server that is not assigned any VM. In one embodiment, the VM assignor selects, if possible a combination of the blade servers where at least one of the blade servers is unused. This unused blade server is then designated as the reserve blade server. For example, method 500 and method 600 are designed to consolidate the VMs to increase the likelihood that at least one blade server is idle or unused so that this server can be powered down. That is, both methods 500 and method 600, when performed, may result in at least one reserve blade server.

At block 710, after the VMs have been assigned and the workloads are executing, the VM assignor monitors the workloads, VMs, and/or blade servers to determine a value of one or more performance metrics. For example, the VM assignor may determine the processor or memory utilization of a blade server or the time needed for a request to be processed by a workload.

If the performance metric exceeds a threshold, at block 715, the VM assignor stitches the reserve blade server to the overworked or stressed blade server that corresponds to the performance metric. For example, if a query throughput of a workload on a blade server falls below a threshold, the blade server is combined with the reserve blade server to yield a stitched blade server. By adding the resources of the reserve blade server to the overworked blade server, the performance metric may improve. Of course, in addition to combining the reserve blade server with an independent blade server, the reserve blade server may be combined with a stitched blade server—i.e., a combination of blade servers. Furthermore, the reserve blade server may be either an independent blade server or a stitched blade server that includes a plurality of unused blade servers.

Figure 8:
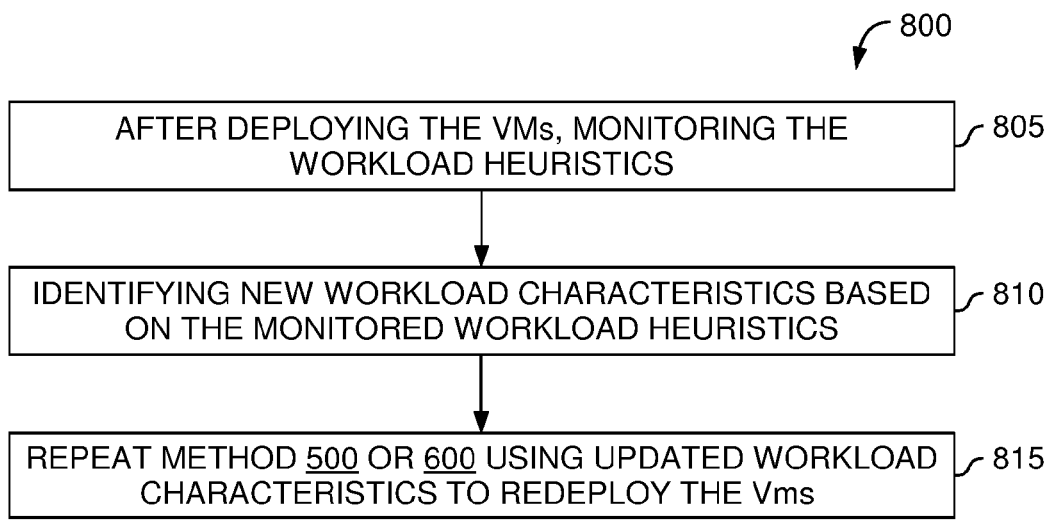
FIG. 8 is a flowchart for redeploying the virtual machines based on monitoring workload heuristics, according to one embodiment described herein.

FIG. 8 is a flowchart for redeploying the virtual machines based on monitoring workload heuristics, according to one embodiment described herein. At block 805, after deploying the VMs, the VM assignor monitors workload heuristics associated with the workloads, the VMs, or the blade servers. For example, the heuristics may include performance metrics such as processor or memory utilization in a blade server or the operation throughput of a workload. Furthermore, the heuristics may include time components such as identifying the times of a day, week, or year where a workload, VM, or blade is the busiest. As such, the VM assignor may monitor the heuristics over an extended period of time. Moreover, this period of time may be predefined or flexible. For example, the monitoring period may be a month or continue until a certain heuristic exceeds a threshold.

At block 810, the VM assignor updates the workload characteristics based on the monitored heuristics. For example, the customer may stipulate that a workload requires 3 processors and 4 GB of memory to execute efficiently. However, by monitoring the heuristics (e.g., processor and memory utilization), the VM assignors determines the characteristics of the workload are actually 5 processors and 2 GB of memory. In one embodiment, the VM assignor may determine that the characteristics of the workload change according to a pattern identified by monitoring the heuristics. For example, a workload may require only 2 processors and 1 GB of memory during most days, but during holidays the workload requires 4 processors and 2 GB of memory.

At block 815, the VM assignor repeats method 500 shown in FIG. 5 or method 600 in FIG. 6 using the updated workload characteristics to redeploy the VMs. That is, because these two methods use the workload characteristics to assign the VMs to the blade servers, if these characteristics change as determined at block 810, the VM assignor again performs one (or both) of these methods to determine if the VMs should be moved to different blade servers and/or whether the blade servers should be stitched together into different combinations. In this manner, even after the VMs are assigned to the blade servers and the computing system is executing, the VM assignor may determine, based on updated workload characteristics, to redeploy the VMs in a different configuration.

While the foregoing is directed to embodiments of the present invention, other and further embodiments of the invention may be devised without departing from the basic scope thereof, and the scope thereof is determined by the claims that follow.

What is claimed is:

1. A system, comprising:
   a computer processor; and
   a memory containing a program that, when executed on the computer processor, performs an operation, the operation comprising:
      assigning workloads to a plurality of virtual machines, wherein each of the plurality of virtual machines is associated with one or more workload characteristics defining an expected amount of computer resources required for executing the workloads assigned to the virtual machine;
      assigning the plurality of virtual machines to a plurality of blade servers by comparing the workload characteristics to combined, available resources of at least two of the plurality of blade servers, wherein each of the plurality of blade servers are physically separate computing devices;
      upon determining the combined available resources satisfy the workload characteristics, switching the at least two of the plurality of blade servers from an independent operational mode to a symmetric multiprocessing (SMP) operational mode to stitch the at least two of the plurality of blade servers together to form a stitched server, wherein setting the at least two of the plurality of blade servers to the SMP operation mode enables the at least two of the plurality of blade servers in the stitched server to share a same hypervisor instance; and
      assigning at least one of the plurality of virtual machines to be executed on the stitched server.

2. The system of claim 1, wherein the operation further comprises:
   sorting the plurality of virtual machines according to the workload characteristics assigned to each of the virtual machines;
   sorting the plurality of blade servers based on available resources in each of the blade servers;
   comparing workload characteristics of a sorted virtual machine of the plurality of virtual machines to available resources of a sorted server of the plurality of blade servers; and
   upon determining that the workload characteristics of the sorted virtual machine exceeds the available resources of the sorted server, comparing the workload characteristics to the combined available resources of the at least two of the plurality of blade servers.

3. The system of claim 2, wherein the operation further comprises:
   stitching the at least two of the plurality of blade servers together to form the stitched server only if one or more of the workload characteristics of the sorted virtual machine does not exceed the available resources of the sorted server by more than a predefined threshold; and
   upon determining one or more of the workload characteristics of the sorted virtual machine does exceed the available resources of the sorted server by more than the predefined threshold, comparing workload characteristics of the sorted virtual machine to available resources of a subsequent sorted server of the plurality of blade servers.

4. The system of claim 1, wherein the operation further comprises:

before assigning the plurality of virtual machines to the plurality of blade servers, determining different possible combinations of combining the plurality of blade servers based on changing a mode of operation of each of the plurality of blade servers between the independent operational mode and the SMP operational mode;

determining, for each of the different possible combinations, an optimization score based on minimizing a number of the plurality of blade servers used to host the plurality of virtual machines; and selecting for deployment the combination with the highest optimization score, wherein the combination includes the stitched server.

5. The system of claim 1, wherein the operation further comprises:

selecting a reserve server from the plurality of blade servers, wherein the reserve server is not assigned any of the plurality of virtual machines;

after executing the plurality of virtual machines using one or more of the plurality of blade servers, monitoring the workloads to identify a value of a performance condition; and upon determining the value exceeds a predefined threshold, stitching the reserve server to an overworked server of the plurality of blade servers associated with the performance condition.

6. The system of claim 1, wherein the operation further comprises, after executing the plurality of virtual machines using one or more of the plurality of blade servers:

monitoring performance heuristics associated with the workloads;

updating the workload characteristics associated with each of the plurality of virtual machines based on the performance heuristics; and redeploying the plurality of virtual machines onto the plurality of blade servers by comparing the updated workload characteristics with the available resources of each of the plurality of blade servers, wherein at least one of the virtual machines is moved to a different server of the plurality of blade servers.

7. A computer program product for configuring a computing system comprising a plurality of blade servers, the computer program product comprising:

a computer-readable storage medium having computer-readable program code embodied therewith, the computer-readable program code configured to:

assign workloads to a plurality of virtual machines, wherein each of the plurality of virtual machines is associated with one or more workload characteristics defining an expected amount of computer resources required for executing the workloads assigned to the virtual machine;

assign the plurality of virtual machines to the plurality of blade servers by comparing the workload characteristics to combined, available resources of at least two of the plurality of blade servers, wherein each of the plurality of blade servers are physically separate computing devices;

upon determining the combined available resources satisfy the workload characteristics, switch the at least two of the plurality of blade servers from an independent operational mode to a SMP operational mode to stitch the at least two of the plurality of blade servers together to form a stitched server, wherein setting the at least two of the plurality of blade servers to the SMP operation mode enables the at least two of the plurality of blade servers in the stitched server to share a same hypervisor instance; and assign at least one of the plurality of virtual machines to be executed on the stitched server.

8. The computer program product of claim 7, further comprising computer-readable program code configured to:

sort the plurality of virtual machines according to the workload characteristics assigned to each of the virtual machines;

sort the plurality of blade servers based on available resources in each of the blade servers;

compare workload characteristics of a sorted virtual machine of the plurality of virtual machines to available resources of a sorted server of the plurality of blade servers; and upon determining that the workload characteristics of the sorted virtual machine exceeds the available resources of the sorted server, compare the workload characteristics to the combined available resources of the at least two of the plurality of blade servers.

9. The computer program product of claim 8, further comprising computer-readable program code configured to:

stitch the at least two of the plurality of blade servers together to form the stitched server only if one or more of the workload characteristics of the sorted virtual machine does not exceed the available resources of the sorted server by more than a predefined threshold; and upon determining one or more of the workload characteristics of the sorted virtual machine does exceed the available resources of the sorted server by more than the predefined threshold, compare workload characteristics of the sorted virtual machine to available resources of a subsequent sorted server of the plurality of blade servers.

10. The computer program product of claim 7, further comprising computer-readable program code configured to:

before assigning the plurality of virtual machines to the plurality of blade servers, determine different possible combinations of combining the plurality of blade servers based on changing a mode of operation of each of the plurality of blade servers between the independent operational mode and the SMP operational mode;

determine, for each of the different possible combinations, an optimization score based on minimizing a number of the plurality of blade servers used to host the plurality of virtual machines; and select for deployment the combination with the highest optimization score, wherein the combination includes the stitched server.

11. The computer program product of claim 7, further comprising computer-readable program code configured to:

select a reserve server from the plurality of blade servers, wherein the reserve server is not assigned any of the plurality of virtual machines;

after executing the plurality of virtual machines using one or more of the plurality of blade servers, monitor the workloads to identify a value of a performance condition; and upon determining the value exceeds a predefined threshold, stitch the reserve server to an overworked server of the plurality of blade servers associated with the performance condition.

* * * * *